United States Patent [19]
Park

[11] Patent Number: 5,643,522
[45] Date of Patent: Jul. 1, 1997

[54] METHOD AND SYSTEM FOR CURING FIBER REINFORCED COMPOSITE STRUCTURES

[76] Inventor: James F. Park, P.O. Box 532, Park City, Utah 84060

[21] Appl. No.: 353,917

[22] Filed: Dec. 12, 1994

[51] Int. Cl.$^6$ ................................................. B29C 35/04
[52] U.S. Cl. ...................... 264/313; 122/7 R; 264/258; 264/347; 264/348; 237/69; 237/58; 237/81; 425/389; 425/440; 425/446; 425/502
[58] Field of Search ........................ 264/313, 347, 264/236, 258, 570, 348; 425/445–446, 378–390, 89, 502, 440; 122/7 R; 237/69, 58, 81

[56] References Cited

U.S. PATENT DOCUMENTS

| | | | |
|---|---|---|---|
| 2,698,458 | 1/1955 | Keach | 425/446 |
| 3,112,520 | 12/1963 | George et al. | 425/389 |
| 3,559,236 | 2/1971 | Merritt | 425/89 |
| 3,608,052 | 9/1971 | Gunn | 264/313 |
| 4,027,543 | 6/1977 | Johnston | 264/570 |
| 4,388,263 | 6/1983 | Prunty | 264/313 |
| 4,842,787 | 6/1989 | Chess, Jr. et al. | 264/313 |
| 4,915,896 | 4/1990 | Rachal et al. | 264/258 |
| 4,997,511 | 3/1991 | Newsom | 264/102 |
| 5,059,377 | 10/1991 | Ashton et al. | 264/258 |
| 5,062,780 | 11/1991 | Nakagaki | 425/389 |
| 5,366,684 | 11/1994 | Corneau, Jr. | 425/389 |

OTHER PUBLICATIONS

"Poles—Its Time For An Attitude Adjustment, Because Pole Technology Has Change", Power Magazine, Oct., 1994.

*Primary Examiner*—Jeffery R. Thurlow
*Attorney, Agent, or Firm*—Thorpe, North & Western, L.L.P.

[57] ABSTRACT

A system for curing composite structures. A hollow bladder having opposing open ends is secured within a metal pressure vessel so as to define an annular space within the vessel surrounding the bladder. The open ends of the bladder are sealably attached to opposing entrances formed in the pressure vessel so that the bladder is sealed from communication with the vessel and is accessible through the opposing openings. An uncured composite part can be inserted into the bladder. Preheated and pressurized fluid is circulated through the annular space and thus around the bladder in order to cure the composite part. The composite part may also be encapsulated within a forming bladder member which is then removably inserted into the pressure bladder.

31 Claims, 2 Drawing Sheets

METHOD AND SYSTEM FOR CURING FIBER REINFORCED COMPOSITE STRUCTURES

BACKGROUND OF THE INVENTION

1. The Field of the Invention

The present invention relates generally to apparatus and methods for curing fiber reinforced composite structures. More particularly, it concerns a system which circulates preheated, pressurized liquid through a pressure chamber in order to cure a composite structure.

2. The Background Art

Fiber reinforced composite parts have achieved widespread acceptance for use in the construction of articles and structural parts. Until recently, such applications were limited mainly to metal parts because of the conventional thinking that only structural metals were capable of withstanding the accompanying torsional and bending stresses. However, the development of fiber reinforced composites having high strength-to-weight ratios has resulted in composites being used in many structural parts, including ski poles, spars for hand gliders and the like, golf shafts, rocket launch tubes, mechanical drive shafts, and so forth.

Historically polyester resin systems with glass fibers were the first composites. They were hand layered into a mold and the resins were brushed onto each layer. Each subsequent layer was done this way until the desired thickness was attained. The polyester resins that were used were precatalyzed with a small percent of methyl ethyl ketone peroxide and this allowed the resins to generate the necessary heat to cause chemical cross linking or cure of the layers to occur over a long period of time at atmospheric pressure. The only pressure that the lay-up saw was the pressure applied by the technician during the lay-up and gravity. This usually resulted in layered parts that had resin-rich and resin-starved areas of the lay-up and inconsistent part to part qualities.

This hand lay-up process, however crude, is still used in this industry today but only for non-critical stress applications. There have been several improvements in the resin chemistry, and in the reinforcing fibers used. Even the methods used to cure have advanced somewhat by some manufacturers adding a vacuum bag over the parts to help improve product quality. However, this additional process is not cost effective when evaluated to the end product improvement values.

The lack of uniformly applied pressure during the curing process led to the development of the traditional autoclave oven-curing process. The autoclave oven is constructed with steel walls four to five inches thick, usually cylindrical in shape with a thicker walled steel door. The door requires the use of hydraulic rams to force the door locking ring mechanism to close and form an air tight seal. Internal electric or gas heating systems provide the source of heat and internal electric fans re-circulate the hot air inside the chamber during the cure cycle. The pressure of the cure chamber is raised by compressed air pressure, controlled by the autoclave operator. Pressures as high as 100 psi and temperatures of 350 degrees Fahrenheit and cure cycles that take 2 to 4 hours to complete are common practice with these devices.

The traditional autoclave oven is extremely dangerous to use because of the very large volume of air at high pressure needed to fill the working chamber. Larger volumes of high pressure gases are more likely to cause injury upon fracture of the vessel. The oven is extremely slow to heat up and to pressurize and slow to cool down. Even though this type of autoclave is popular in the industry, it is not very efficient to operate and the initial costs are extremely high.

Compacting of the composite part is typically accomplished by applying cellophane shrink tape over the surface of the part by a high pressure applicator, after which the part is cured in the autoclave oven. After the part is cured, the cellophane tape is removed, usually by a scrubber machine. The cellophane tape leaves creases in the part which must be smoothed out by sanding or grinding. The sanding and grinding often damages some of the reinforcing fibers which reduces the structural integrity of the part. Further, the cellophane tape cannot maintain a uniform pressure on the part because the high temperatures produced within the autoclave oven cause the tape to expand. Some of the compaction needed to prevent air voids and resin seepage is therefore lost during the curing process.

OBJECTS AND SUMMARY OF THE INVENTION

It is therefore an object of the present invention to provide a system for curing composite structures which is more economical to manufacture and use.

It is another object of the invention to provide such a system which is less likely to cause injury.

It is a further object of the invention to provide such a system which is capable of applying heat and pressure to a composite part more evenly and uniformly.

It is still another object of the invention to provide such a system which requires less time to operate.

It is yet another object of the invention, in accordance with one aspect thereof, to provide such a system which enables inner forming bladders to be more easily repaired and replaced.

It is a further object of the invention, in accordance with one aspect thereof, to provide such a system which is capable of curing composite parts having different shapes.

The above objects and others not specifically recited are realized in a specific illustrative embodiment of a system for curing composite structures. A hollow bladder having opposing open ends is secured within a metal pressure vessel so as to define an annular space within the vessel surrounding the bladder. The open ends of the bladder are sealably attached to opposing entrances formed in the pressure vessel so that the bladder is sealed from communication with the vessel and is accessible through the opposing openings. An uncured composite part can be inserted into the bladder. Preheated and pressurized liquid is circulated through the annular space and thus around the bladder in order to cure the composite part. The composite part may also be encapsulated within a forming bladder member which is then removably inserted into the pressure bladder.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF PRESENTLY PREFERRED MODES

Figure 1:
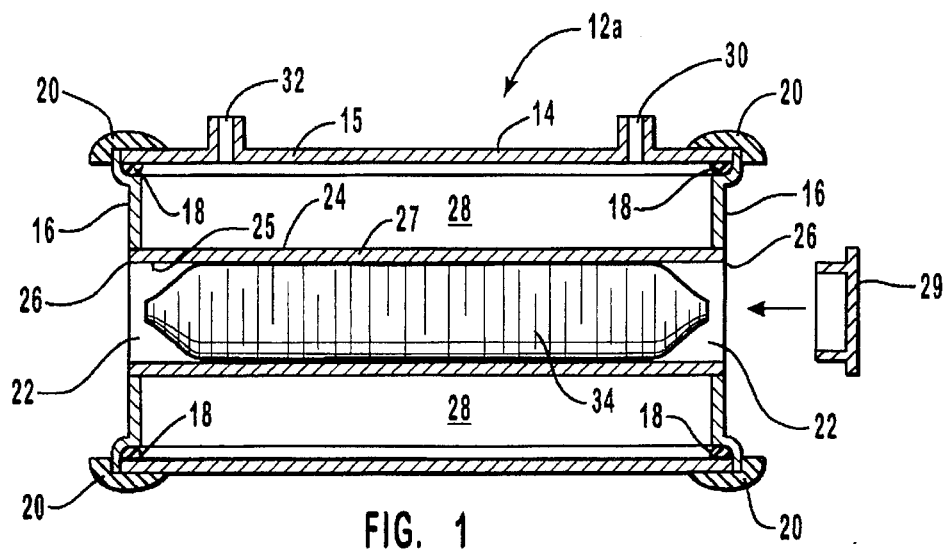
FIG. 1 is a side cross-sectional view of a single-bladder pressure vessel made in accordance with the principles of the present invention.
Figure 2:
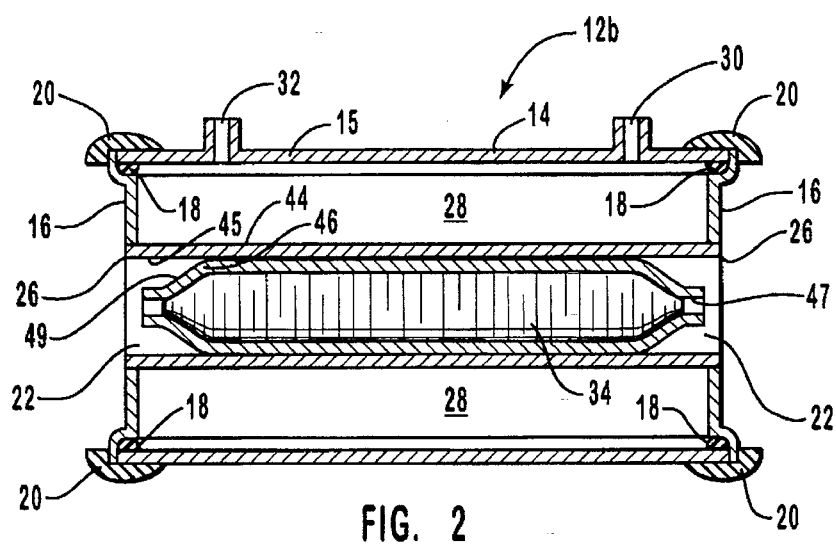
FIG. 2 is a side cross-sectional view of a preferred, double-bladder pressure vessel made in accordance with the principles of the present invention.
Figure 3:
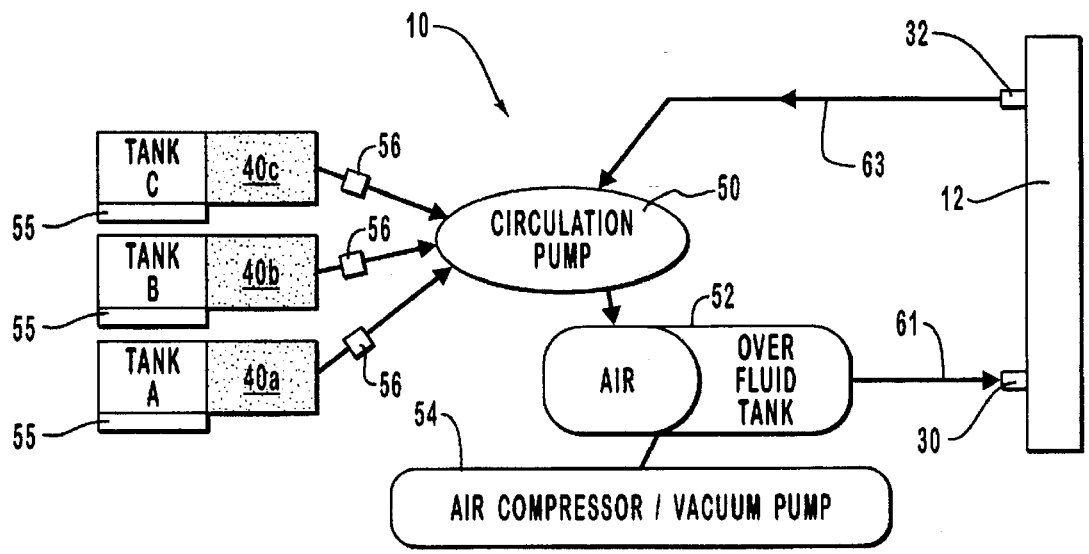
FIG. 3 is a schematic illustration of a curing system made in accordance with the principles of the present invention.

Referring now to FIGS. 1–3, there is shown a system for curing composite structure, generally designated at 10 (FIG. 3). The system 10 includes a vessel 12, which can be either a single-bladder vessel, generally designated at 12a (FIG. 1) or a double-bladder vessel, generally designated at 12b (FIG. 2).

Referring to FIG. 1, the single-bladder vessel 12a includes a pressure vessel 14 preferably made from metal. The vessel 14 includes end plates 16 secured at opposing ends of vessel wall 15 with gaskets 18 and clamps 20. The end plates 16 include entrances 22. An elongate, hollow, tubular forming bladder 24 includes first and second opposing open ends 26 and is sealably attached to the end plates 16 at the entrances 22 thereof, respectively, such that the bladder 24 is sealed from communication with the hollow interior of the vessel 14. The bladder 24 and the vessel 14 cooperatively form an annular space 28 therebetween. Inlet and outlet ports 30 and 32 are formed in the vessel 14 to enable fluid to be circulated through the annular space 28 defined by the vessel 14.

The system 10 is operated by inserting an uncured composite structure 34 into the bladder 24. Preheated liquid 40a–c (FIG. 3) is circulated under positive pressure through the annular space 28 of the vessel 14 and around the forming bladder 24 to thereby transmit heat and pressure through the bladder 24 and onto composite structure 34. The structure 34 is cured thereby, and optional safety caps 29 can be inserted into the open ends 26 of the forming bladder 24 as shown in FIG. 1 to prevent any contents of the bladder from exiting therefrom prematurely. The preheated liquid 40 may comprise any suitable liquid. Applicant has found that anti-freeze solution having a higher boiling point than water is preferable for this purpose, in order to prevent the liquid from boiling during use and from freezing during nonuse. Anti-freeze solutions also reduce corrosion within the system 10.

The bladder 24 preferably includes an interior surface 25 configured and dimensioned to conform to a desired shape and configuration so as to maintain the composite structure 34 in a desired shape and configuration during curing. For example, the interior surface 25 may define a frusto-conical tapered shape, a polygonal shape, a cylindrical shape, or any other shape which conforms to a desired external shape for the composite structure 34.

The forming bladder 24 preferably includes side walls 27 having a uniform wall thickness to thereby enable the circulating liquid 40a–c to transmit heat and pressure substantially uniformly upon the composite structure 34. The bladder 24 is resilient, preferably being formed from silicone rubber, and is designed to fit tightly around the composite structure 34. For example, an interior diameter of the forming bladder 24 is preferably smaller than an outer diameter of the composite structure 34 when the bladder 24 is in an unstretched position, such that the bladder 24 must be expandably stretched in order to accept the composite structure. A snug, secure fit of the forming bladder 24 around the composite structure 34 as utilized within the system 10 prevents wrinkles in the composite part and the occurrence of resin-rich and resin-starved areas within the composite structure. Use of the forming bladder 24 obviates a need for the cellophane pressure tape used in conventional curing processes and operates to maintain necessary pressure without forming folds and creases in the surface of the composite structure 34. The finished product is quite smooth. This enables a much better-compacted composite part and eliminates the need for vigorous sanding or grinding so as to produce a smooth part. The composite structure 34 may be painted directly or lightly abraded prior to painting. Damage to the fiber reinforcements during the rough sanding and grinding required with the use of cellophane tape is thus prevented.

Figure 4:
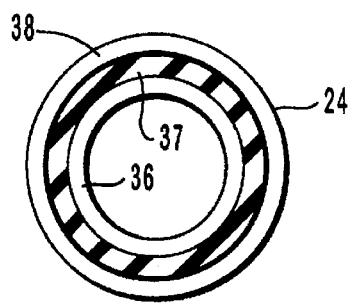
FIG. 4 is a front cross-sectional view of an alternative embodiment of the forming bladder of FIG. 2.

The forming bladder 24 may also be multi-layered as in FIG. 4. A three-layered forming bladder as shown in FIG. 4 includes inner and outer layers 36 and 38 made of silicone rubber or a suitable equivalent thereof, and an intermediate layer 37 sandwiched between the inner the outer layers which is fiber-reinforced with woven fiber filaments. The bladder shown in FIG. 4 combines the resilience of silicone rubber with the strength of the fiber reinforcements of the intermediate layer 37.

The double-bladder vessel 12b shown in FIG. 2 includes most of the same features of the single-bladder version of FIG. 1. Therefore, like structures shall be referred to in FIG. 2 with like reference numerals in the manner of FIG. 1. One exception is the replacement of the forming bladder 24 of FIG. 1 with a pressure bladder 44 and a removable forming bladder 46. The pressure bladder 44 is preferably made from strong fiber-reinforced silicone hose, and the removable forming bladder 46 is made of resilient silicone rubber. The removable forming bladder 46 may also be constructed in a multi-layered, fiber-reinforced configuration as in FIG. 4.

Art uncured composite structure 34 is encapsulated within the removable forming bladder 46, and preheated, pressurized liquid is circulated through the annular space 28 of the double-bladder vessel 12b. The double-bladder vessel 12b has a number of advantages over the single-bladder vessel 12a. For example, the same vessel 14 can be used to cure composite structures of a number of different shapes by using a variety of different removable forming bladders 46, because it is the removable forming bladder 46 which conforms to the composite structure 34. In addition, the removable forming bladder 46 is easily repairable or replaceable when damaged, whereas the system 10 must be drained of liquid in order to repair or replace the forming bladder 24 in the single-bladder vessel 12a.

The pressure bladder 44 includes a preferably cylindrical interior surface 45. The removable forming bladder 46 includes in interior surface 47 configured and dimensioned to maintain the composite structure 34 in a desired shape and configuration during curing, and is preferably smaller than the composite structure so as to enable a tight, secure fit. Whatever the internal shapes and configurations of the bladders 44 and 46, it is preferred that the interior surface 45 of the pressure bladder 44 be substantially parallel to an exterior surface 49 of the removable forming bladder 46. This parallel relationship enable the circulating liquid 40 to transmit heat and pressure substantially uniformly upon the composite encapsulated composite structure 34. It is noted that curved lines and surfaces can be characterized as being parallel, as well as straight lines and surfaces, as is known to those skilled in the relevant mathematics.

Referring now to FIG. 3, the system 10 is operated by actuating a circulation pump 50 which pumps the preheated liquid 40a–c into the vessel 12 (which can be either the single-bladder vessel 12a or the double-bladder vessel 12b). The liquid is circulated through the vessel 12, out the outlet port 32 and back to the pump 50 as shown. An air over fluid holding tank 52 as known in the art is disposed in fluid communication with the pump/circulation system, and a combination air compressor/vacuum pump (compressor/ vacuum) 54 operates to impose selectively either a positive pressure or a negative pressure to the liquid 40a–c being circulated through the vessel 12. The phrase "positive pressure" as used herein shall refer to a pressure which is greater than atmospheric pressure, and the phrase "negative pressure" shall refer to any subatmospheric pressure. Accordingly, the compressor/vacuum 54 can be operated to impose a negative pressure to the liquid in the vessel 12 to thereby expand radially outwardly the bladder (24 in FIG. 1 or 44 in FIG. 2) secured to the vessel 12 so as to aid a user in inserting/removing the composite structure 34 into/from the bladder means.

The system 10 may utilize a single liquid tank, but is preferably equipped with three liquid tanks, designated as tank A, tank B and tank C in FIG. 3. The tanks A–C respectively contain their own separate liquid supplies 40a–c. Each tank A–C is equipped with a heating unit 55 for maintaining its fluid supply at a predetermined temperature. For example, fluid 40a is preferably maintained within a temperature range of approximately 250–350 degrees Fahrenheit, liquid 40b is preferably maintained within a temperature range of approximately 150–200 degrees Fahrenheit, and liquid 40c is preferably maintained within a temperature range of approximately 80–120 degrees Fahrenheit.

Flow control valves 56 are disposed in communication with the liquid tanks A–C for alternately blocking and releasing liquid flow within each of said liquid tanks A–C. The circulation pump 50 operates in conjunction with the flow control valves 56 to circulate liquid 40a–c from one of the three liquid tanks A–C without circulating liquid from the remaining two liquid tanks. In this manner, the hotter liquid 40a is circulated by the circulation pump 50 during the curing cycle, after which the liquid 40b is circulated to there by reduce the temperature of the composite structure 34 to an intermediate cooled temperature. Finally, the coolest liquid 40c is circulated so as to cool the composite structure 34 to a final cooled temperature suitable for removing the structure 34 from the system 10.

One advantage of the system 10 the temperature of the composite structure 34 can be raised to its curing temperature (typically about 260° F.) much quicker, and lowered to a temperature suitable to enable removal of the structure 34 (typically about 100° F.) much quicker. For example, the present invention has been found to raise a composite structure to its curing temperature in about two minutes, as opposed to twenty minutes in the traditional autoclave system. The temperature of the structure 34 can be lowered to a final cooled temperature in about five minutes, compared to about twenty minutes with the traditional autoclave oven.

Figure 5:
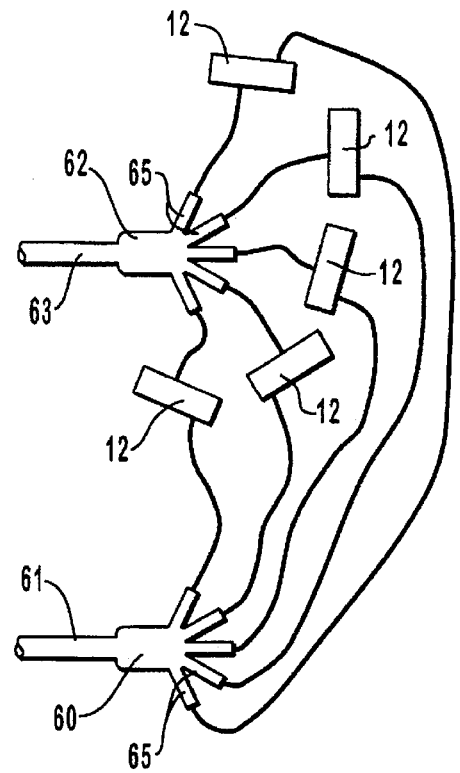
FIG. 5 is a fragmented, schematic illustration of an alternative embodiment of the curing system of FIG. 3.

Referring now to FIG. 5, applicants have found that the system 10 can be adapted to circulate preheated, pressurized liquid to a plurality of vessels 12 with the use of a supply manifold 60 connected to inlet tube 61 and a return manifold 62 connected to outlet tube 63 (corresponding to inlet and outlet tubes 61 and 63 of FIG. 3). Each manifold includes a plurality of liquidly-interconnected passages 65 (up to one hundred or more) configured for communicating with a corresponding plurality of vessels 12. In this manner, the plurality of vessels 12 are enabled to be disposed in parallel communication with the circulation pump 50 for the simultaneous circulation of preheated, pressurized liquid to each of the vessels 12. Applicants has found that large numbers of composite structures (i.e. one hundred or more) can be cured much more economically with this approach as compared to the traditional autoclave oven even though separated vessels 12 are needed for each composite part to be cured. The traditional autoclave oven is so expensive to build and operate that the smaller vessels 12 and the staged liquid cooling process described above reduces greatly the curing costs. Applicant's vessels 12 are less than six feet long and less than three inches in diameter, and usually about five feet long and two inches in diameter. Of course, vessels 12 of any size and configuration are within the scope of the present invention.

A preferred method for curing a composite part with the single-bladder vessel 12a includes the steps of:

(a) applying negative pressure to liquid residing within a pressure vessel to thereby expand radially outward a first resilient bladder contained within the vessel;

(b) inserting an uncured composite structure into the first resilient bladder;

(c) circulating the liquid under positive pressure through the pressure vessel and around the bladder to thereby transmit heat and pressure through the bladder and onto the composite structure so that the composite structure is cured thereby;

(d) applying negative pressure again to the liquid to expand radially the first bladder and remove the composite structure.

Step (b) of the method above can be modified in the case of the double-bladder vessel 12b to further comprise encapsulating the uncured composite structure within a resilient forming bladder means for maintaining said composite structure in a desired shape, and inserting the forming bladder means and encapsulated composite structure into the first resilient bladder.

This method can be advantageously augmented by the following step:

(e) circulating cooling liquids through the pressure vessel means and around the bladder means after the composite structure is cured to thereby cool the composite structure.

Figure 6:
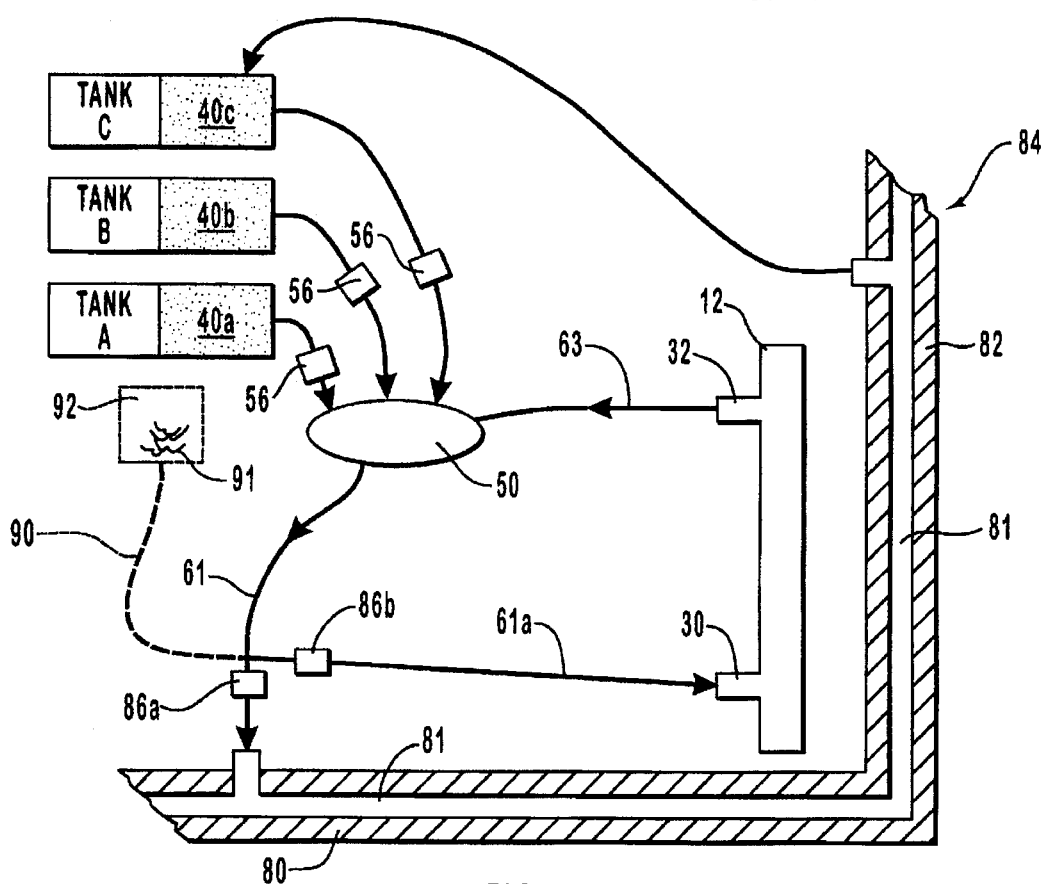
FIG. 6 is a fragmented, schematic illustration of an alternative embodiment of the curing system of FIG. 3 incorporated within a building.

Referring now to FIG. 6, one of the advantageous by-products of the present invention is that it can be incorporated into a building, such as a manufacturing warehouse, so as to heat the building. For example, either the inlet tube 61 or the outlet tube 63, or both, can be diverted and rerouted to pass through liquid tubing 81 which has been incorporated into floors 80 or walls 82 of a building 84. In this manner, heat from the preheated liquid 40a–c (FIG. 3) can be used to heat the building. Applicant has found that tremendous cost savings can be realized with this approach. More specifically, applicant has found that the building 84 can be heated adequately if just the intermediate cooling liquid 40b of 150°–200° F. (FIG. 3) is routed through the liquid tubing 81 and into tank C. This rerouting accomplishes dual objectives of heating the building 84 and cooling the fluid 40b obtained from tank B to the desired final cooling temperature range for use as liquid 40c.

This selective routing can be accomplished in any suitable manner known in the art, such as by utilizing an inlet connector 61a and control valves 86. By opening valve 86b and closing valve 86a, the curing liquid 40a and final cooling liquid 40c (FIG. 3) can be caused to pass from the inlet tube 61 directly into the inlet port 30 of the vessel 12. During application of the intermediate liquid 40b (FIG. 3), valve 86a can be opened and valve 86b can be closed, or both valves 86a–b can be opened in order to cause the preheated liquid 40b to pass through the liquid tubing 81 and heat the floor 80 and/or the wall 82 of the building 84, thus cooling the liquid 40b to a desired temperature for use as liquid 40c.

It is to be understood that the liquid tubing 81 can be incorporated into any structure to be heated, such as a footpath of any kind. The term "footpath" as used herein shall be construed to refer broadly to any structure or surface upon which people may walk, such as floors, sidewalks, parking lots, trails, balconies and the like. Further, the preheated liquid 40a–c may be routed through a vented line 90 (shown in phantom line) which is vented to atmosphere to thereby cause said preheated liquid 40a–c to produce steam 91. The steam 91 could then be exposed to a steam generator 92 (shown in phantom line) to thereby drive the generator.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A pressure vessel system for curing fiber reinforced composite structures comprising:

hollow pressure vessel means; and resilient bladder means disposed within the pressure vessel means for releasably receiving an uncured composite structure therein, wherein the bladder means and the pressure vessel means cooperatively form an annular space therebetween;

means for circulating preheated, pressurized liquid through the annular space at a pressure higher than atmospheric pressure and in a manner sufficient to cure an uncured composite structure residing within the bladder means;

wherein the resilient bladder means is a first bladder means, the system further comprising resilient forming bladder means for encapsulating an uncured composite structure therein and maintaining said composite structure in a desired shape, said forming bladder means being configured for removable insertion into the first bladder means.

2. A system as defined in claim 1, further comprising:

means for circulating preheated liquid under positive pressure through the annular space defined by the pressure vessel means and around the bladder means to thereby transmit heat and pressure through the bladder means and onto the composite structure so that the composite structure is cured thereby.

3. A system as defined in claim 1, wherein the bladder means includes an interior surface configured and dimensioned to conform to a desired shape and configuration for the composite structure so as to maintain the composite structure in said desired shape and configuration during curing thereof.

4. A system as defined in claim 3, wherein the bladder means comprises a tubular member including side walls having a uniform wall thickness to thereby enable the circulating liquid to transmit heat and pressure substantially uniformly upon the composite structure.

5. A pressure vessel system for curing fiber reinforced composite structures comprising:

hollow pressure vessel means; and resilient bladder means disposed within the pressure vessel means for releasably receiving an uncured composite structure therein, wherein the bladder means and the pressure vessel means cooperatively form an annular space therebetween, wherein the bladder means has an interior diameter which is smaller than an outer diameter of the composite structure when said bladder means is in an unstretched position;

means for circulating preheated, pressurized liquid through the annular space defined by the pressure vessel means and around the bladder means at a pressure higher than atmospheric pressure to thereby transmit heat and pressure through the bladder means and onto the composite structure in a manner sufficient to cure an uncured composite structure residing within the bladder means;

means for placing fluid contained within the pressure vessel means under negative pressure to thereby expand radially outwardly the bladder means so as to aid a user in inserting/removing the composite structure into/from the bladder means.

6. A system as defined in claim 2, wherein the means for circulating further comprises means for circulating cooling liquids through the pressure vessel means and around the bladder means to thereby cool the composite structure.

7. A pressure vessel system for curing fiber reinforced composite structures comprising:

hollow pressure vessel means; and resilient bladder means disposed within the pressure vessel means for releasably receiving an uncured composite structure therein, wherein the bladder means and the pressure vessel means cooperatively form an annular space therebetween;

means for circulating preheated, pressurized liquid through the annular space at a pressure higher than atmospheric pressure and in a manner sufficient to cure an uncured composite structure residing within the bladder means;

means for (i) circulating preheated liquid under positive pressure through the annular space defined by the pressure vessel means and around the bladder means to thereby transmit heat and pressure through the bladder means and onto the composite structure so that the composite structure is cured thereby, and (ii) circulating cooling liquid through the pressure vessel means and around the bladder means to thereby cool the composite structure;

wherein the means for circulating further comprises:

first, second and third liquid tanks;

circulation pumping means disposed in communication with the pressure vessel means and the liquid tanks for circulating liquid between the tanks and the pressure vessel means;

heating means for maintaining liquid in the first, second and third liquid tanks within first, second and third predetermined temperature ranges, respectively; and flow control valve means disposed in communication with the first, second and third fluid tanks for alternately blocking and releasing fluid flow within each of said first, second and third fluid tanks to thereby enable the circulation pumping means to circulate fluid from one of the three fluid tanks without circulating fluid from the remaining two fluid tanks.

8. A system as defined in claim 7, wherein the liquid maintained within the first temperature range is of a temperature suitable for curing the composite structure, and wherein the second and third temperature ranges are lower ranges than the first temperature range such that liquids maintained within said second and third temperature ranges are suitable for cooling the composite structure from its temperature during curing to a lower temperature.

9. A system as defined in claim 2, wherein the means for circulating further comprises:

an inlet tube and an outlet tube each configured for channeling liquid flow;

a supply manifold disposed in communication with the inlet tube and having a plurality of fluidly-interconnected passages configured for communicating with a corresponding plurality of pressure vessel means;

a return manifold disposed in communication with the outlet tube and having a plurality of fluidly-interconnected passages configured for communicating with the corresponding plurality of pressure vessel means to thereby enable a plurality of pressure vessel means to be disposed in parallel communication with the means for circulating so as to enable said means for circulating to circulate liquid through each the pressure vessel means.

10. A method for curing composite structures comprising the steps of:

(a) encapsulating an uncured composite structure within a resilient forming bladder means for maintaining said composite structure in a desired shape, and inserting the forming bladder means and encapsulated composite structure into a first resilient bladder, said bladder being disposed within a pressure vessel having a hollow interior; and (b) circulating preheated liquid under positive pressure higher than atmospheric pressure through the pressure vessel and around the bladder to thereby transmit heat and pressure through the bladder and onto the composite structure in a manner sufficient so that the composite structure is cured thereby.

11. A system as defined in claim 1, wherein the forming bladder means includes an interior surface configured and dimensioned to conform to a desired shape and configuration for the composite structure so as to maintain the composite structure in said desired shape and configuration during curing thereof.

12. A system as defined in claim 1, wherein the first bladder means includes an interior surface which is configured to be substantially parallel to an exterior surface of the forming bladder means when an uncured composite structure is encapsulated within the forming bladder means to thereby enable the circulating liquid to transmit heat and pressure substantially uniformly upon the composite structure.

13. A system as defined in claim 1, wherein the forming bladder means further comprises a three-layered hollow bladder having inner and outer layers made of silicone rubber and an intermediate layer sandwiched between the inner and outer layers which is fiber-reinforced with woven fiber filaments.

14. A system as defined in claim 1, wherein the pressure vessel means comprises a hollow pressure vessel which is less than six feet long and less than three inches in diameter.

15. A system as defined in claim 2, wherein the means for circulating includes means for circulating the preheated fluid along a fluid flow path which passes through walls or floors or footpaths other than floors to thereby heat said walls, floors or other footpaths during operation of the system.

16. A system as defined in claim 2, wherein the means for circulating includes means for discharging the liquid from the pressure vessel means and removing positive pressure from the discharged liquid to thereby cause said discharged liquid to produce steam, and exposing said steam to a steam generator to thereby drive the generator.

17. A pressure vessel system for curing fiber reinforced composite structures comprising:

elongate pressure vessel means having a hollow interior and first and second opposing entrances formed therein, said hollow interior defining an interior circumference;

an elongate, hollow pressure bladder having an outer circumference which is smaller than the interior circumference of the pressure vessel means and being disposed within said pressure vessel means, said pressure bladder further including first and second opposing open ends sealably attached to the pressure vessel means at the first and second opposing entrances thereof, respectively, such that the hollow pressure bladder is sealed from communication with the hollow interior of the pressure vessel means, wherein the pressure bladder and the pressure vessel means cooperatively form an annular space therebetween for receiving preheated, pressurized fluid therein to cure an uncured composite structure residing within the pressure bladder; and resilient forming bladder means for encapsulating an uncured composite structure therein and maintaining said composite structure in a desired shape, said forming bladder means being configured for removable insertion into the pressure bladder through either the first or second open end thereof in a substantially parallel orientation with respect to the pressure bladder.

18. A system as defined in claim 17, further comprising:

means for circulating preheated liquid under positive pressure through the annular space formed by the pressure vessel means and around the pressure bladder to thereby transmit heat and pressure through the pressure bladder and onto the forming bladder means and encapsulated composite structure so that the composite structure is cured thereby.

19. A system as defined in claim 18 further comprising means for placing liquid contained within the pressure vessel means under negative pressure to thereby expand radially outwardly the bladder means so as to aid a user in inserting/removing the composite structure into/from the bladder means.

20. A system as defined in claim 18 wherein the means for circulating further comprises means for circulating cooling liquids through the pressure vessel means and around the bladder means to thereby cool the composite structure.

21. A system as defined in claim 20, wherein the means for circulating comprises:

first, second and third liquid tanks;

circulation pumping means disposed in communication with the pressure vessel means and the liquid tanks for circulating liquid between the tanks and the pressure vessel means;

heating means for maintaining liquid in the first, second and third liquid tanks within first, second and third predetermined temperature ranges, respectively; and flow control valve means disposed in communication with the first, second and third liquid tanks for alternately blocking and releasing liquid flow within each of said first, second and third liquid tanks to thereby enable the circulation pumping means to circulate liquid from one of the three fluid tanks without circulating liquid from the remaining two fluid tanks.

22. A system as defined in claim 21, wherein the means for circulating further comprises:

an inlet tube and an outlet tube each configured for channeling liquid flow;

a supply manifold disposed in communication with the inlet tube and having a plurality of fluidly-interconnected passages configured for communicating with a corresponding plurality of pressure vessel means;

a return manifold disposed in communication with the outlet tube and having a plurality of liquidly-interconnected passages configured for communicating with the corresponding plurality of pressure vessel means to thereby enable a plurality of pressure vessel means to be disposed in parallel communication with the means for circulating so as to enable said means for circulating to circulate liquid through each of the pressure vessel means.

23. A system as defined in claim 22 wherein the pressure bladder means includes an interior surface which is configured to be substantially parallel to an exterior surface of the forming bladder means when an uncured composite structure is encapsulated within the forming bladder means to thereby enable the circulating liquid to transmit heat and pressure substantially uniformly upon the composite structure.

24. A system as defined in claim 23, wherein the forming bladder means further comprises a three-layered hollow bladder having inner and outer layers made of silicone rubber and an intermediate layer sandwiched between the inner and outer layers which is fiber-reinforced with woven fiber filaments.

25. A system as defined in claim 18, wherein the means for circulating includes means for circulating the preheated liquid along a liquid flow path which passes through walls or floors or footpaths other than floors to thereby heat said walls, floors or other footpaths during operation of the system.

26. A method for curing composite structures comprising the steps of:

(a) inserting an uncured composite structure into a first resilient bladder, said bladder being disposed within a pressure vessel having a hollow interior;

(b) circulating preheated liquid under positive pressure higher than atmospheric pressure through the pressure vessel and around the bladder to thereby transmit heat and pressure through the bladder and onto the composite structure in a manner sufficient so that the composite structure is cured thereby;

(c) circulating cooling liquids through the pressure vessel means and around the bladder means after the composite structure is cured to thereby cool the composite structure;

wherein step (b) further comprises circulating preheated liquid having a temperature within a range of approximately 250–350 degrees Fahrenheit, and wherein step (c) further comprises the steps of:

(e) circulating an intermediate cooling fluid having a temperature within a range of approximately 150–200 degrees Fahrenheit to thereby reduce the temperature of the composite structure to an intermediate cooled temperature; and (e) circulating a final cooling fluid having a temperature within a range of approximately 80–120 degrees Fahrenheit to thereby reduce the temperature of the composite structure to a final cooled temperature.

27. A method as defined in claim 10, further comprising the step of:

(c) sealably attaching first and second opposing open ends of the bladder to first and second opposing entrances of the pressure vessel means, respectively, such that the bladder is sealed from communication with the hollow interior of the pressure vessel, such that the bladder and the pressure vessel cooperatively form an annular space therebetween, and placing liquid contained within the pressure vessel means under negative pressure to thereby expand radially outwardly the bladder means so as to aid a user in inserting/removing the composite structure into/from the bladder means.

28. A method as defined in claim 10, further comprising the step of:

(d) circulating cooling liquid through the pressure vessel means and around the bladder means after the composite structure is cured to thereby cool the composite structure.

29. A method as defined in claim 10, wherein step (b) further comprises circulating preheated liquid under positive pressure from a circulation pump through a supply manifold so as to be diverted along various parallel flow paths to a plurality of pressure vessels, and from the pressure vessels to a return manifold so as to recombine the liquid into a single flow path back to the circulation pump, wherein each pressure vessel includes a bladder containing an uncured composite structure therein such that said liquid circulates around the bladders to thereby transmit heat and pressure through the bladders and onto the composite structures so that the composite structures are cured thereby.

30. A method as defined in claim 10, wherein step (a) further comprises encapsulating the uncured composite structure within a forming bladder means having an exterior surface which is configured to be substantially parallel to an interior surface of the first bladder to thereby enable the circulating liquid to transmit positive pressure substantially uniformly upon the composite structure.

31. A method as defined in claim 10, wherein step (b) further comprises circulating the preheated liquid along a liquid flow path which passes through walls or floors or footpaths other than floors to thereby heat said walls, floors or other footpaths during operation of the system.

* * * * *